United States Patent [19]

Fye

[11] 4,431,258
[45] Feb. 14, 1984

[54] OPTICAL FIBER TRANSMISSION SYSTEM AND DICHROIC BEAM SPLITTER THEREFOR

[75] Inventor: Donald M. Fye, Wayland, Mass.

[73] Assignee: GTE Laboratories Incorporated, Waltham, Mass.

[21] Appl. No.: 330,996

[22] Filed: Dec. 15, 1981

[51] Int. Cl.³ .................... G02B 5/28; G02B 27/10
[52] U.S. Cl. .................... 350/1.6; 350/166; 350/173; 350/174
[58] Field of Search ............... 350/166, 164, 163, 1.6, 350/173, 171, 174, 169, 96.15, 286

[56] References Cited

U.S. PATENT DOCUMENTS

| | | | |
|---|---|---|---|
| 2,834,246 | 5/1958 | Foskett et al. | 350/166 |
| 3,423,147 | 1/1969 | Thelen | 350/166 |
| 3,537,306 | 11/1970 | Bedinger | 350/166 |
| 4,373,782 | 2/1983 | Thelen | 350/166 |

FOREIGN PATENT DOCUMENTS 56-138707 10/1981 Japan .................... 350/96.15

OTHER PUBLICATIONS

Aiden E. Roche, Alan M. Title, "Tilt Tunable ... Filters...", *Appl. Opt.*, vol. 14, No. 3, pp. 765-770, (1975).

Primary Examiner—Jon W. Henry
Attorney, Agent, or Firm—Fred Fisher

[57] ABSTRACT

A dichroic beamsplitter includes two glass prisms, each having an isosceles right triangular cross section, with a multilayer dielectric coating sandwiched therebetween. Each layer of the coating is tuned for quarter-wave operation with 45° incidence of light at 0.83 μm. The coating comprises 53 layers of three different materials arranged in a specific order. The materials have refractive indexes of 1.45, 1.625, and 2.25 and can be, for example, silicon dioxide, aluminum oxide, and titanium oxide. An optical fiber transmission system includes an optical fiber and a beamsplitter at opposite ends thereof. One of the beamsplitters is oriented with respect to the fiber at 43° incidence and has a high nonpolarizing reflectance at a wavelength $\lambda_2$ and a low loss transmission at a wavelength $\lambda_1$. The other beamsplitter is oriented with respect to the fiber at a 47° incidence and has a high nonpolarizing reflectance at the wavelength $\lambda_1$ and a low loss transmission at the wavelength $\lambda_2$. The value of the wavelength $\lambda_1$ is 0.81 μm and the value of the wavelength $\lambda_2$ is 0.85 μm. A combination, including a dichroic beamsplitter having a high nonpolarizing reflectance at the wavelength $\lambda_2$ and low loss transmission at the wavelength $\lambda_1$, has a signal at the wavelength $\lambda_1$ to one side thereof. An optic fiber receives the signal to the wavelength $\lambda_1$ at an opposite side of the beamsplitter. A signal at the wavelength $\lambda_2$ is provided to the beamsplitter at a third side thereof, perpendicular to both aforesaid sides, so that the signal at the wavelength $\lambda_2$ is reflected to the optic fiber for transmission therethrough. A detector for power monitoring is coupled to a fourth side of the beamsplitter, the fourth side being directly opposite to the third side thereof.

5 Claims, 3 Drawing Figures

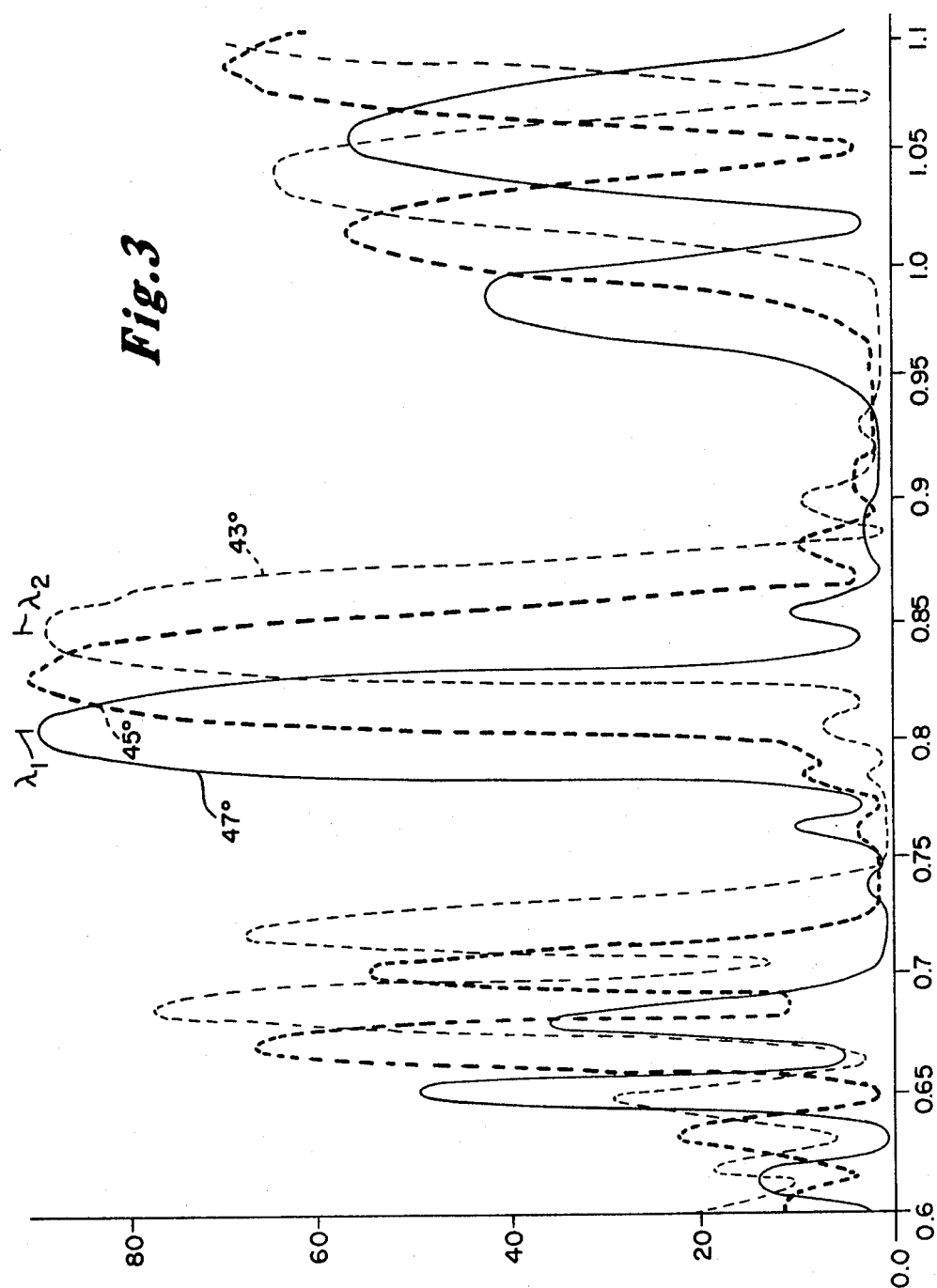

4,431,258

OPTICAL FIBER TRANSMISSION SYSTEM AND DICHROIC BEAM SPLITTER THEREFOR

BACKGROUND OF THE INVENTION

1. Field of the Invention

This invention relates to a wavelength multiplexed optical fiber transmission system, and a dichroic beamsplitter therefor. Accordingly, it is a general object of this invention to provide a new and improved system and splitter of such character.

2. Description of the Prior Art

Dichroic beamsplitter optical wavelength multiplexers, in the past, have been considered practical for only widely separated wavelengths, such as, for example, 0.85 μm and 1.06 μm, due to the unavailability of beamsplitters that operate efficiently for smaller wavelength separation.

At least one report, including one by W. J. Tomlinson, *Applied Optics* 16, p. 2180 (1977), has concluded that dichroic beamsplitters are impractical for wavelength multiplexing in an optical system because their characteristics are strongly polarization dependent.

K. Aoyama and J. Minowa, *Applied Optics* 18, p. 2834 (1979), and Tomlinson in the cited *Applied Optics* 16 article have concluded that the optimum manner for achieving optical wavelength multiplexing is through the use of blazed diffraction gratings. A wavelength multiplexer was reported by Aoyama and Minowa, in the *Applied Optics* 18 article, which utilizes a grating technique for achieving a 200 Å interchannel wavelength spacing.

SUMMARY OF THE INVENTION

Another object of this invention is to provide for a new and improved device for achieving low loss, full duplex communications over a single optical fiber through the use of optical wavelength multiplexing.

Still another object of this invention is to provide for a new and improved dichroic beamsplitter capable of simultaneous application as an optical power monitor suitable for utilization in a feedback system for stabilizing transmitted optical power from a laser diode.

Still yet another object of this invention is to provide for a new and improved non-polarizing, dichroic beamsplitter for wavelength multiplexing having low insertion loss with polarized light.

Yet still another object of this invention is to provide for a new and improved multilayer stack for incorporation in a nonpolarizing dichroic beamsplitter utilized as an optical wavelength duplexer.

Another object of this invention is to provide for a new and improved dichroic mirrored duplex system which operates at 0.81 μm and 0.85 μm.

Still yet another object of this invention is to provide for a new and improved dichroic beamsplitter having complementary optical characteristics at each end of a fiber link in which angle tuning is utilized.

Yet still another object of this invention is to provide for a new and improved dichroic beamsplitter which simultaneously functions as a wavelength duplexer and as an optical power monitor.

In accordance with one embodiment of this invention, a dichroic beamsplitter includes two glass prisms, each having an isosceles right triangular cross section and a multilayer dielectric coating sandwiched therebetween. Each layer of the coating is tuned for quarterwave operation with 45° incidence of light at 0.83 μm and the coating comprises a plurality of layers of materials in the following order CBABABABCB-CBABABABCBC BABABCBABABCB-CBABABABCBCBABABABC, wherein A, B, and C represent different materials. In accordance with certain features of the invention, the material A has a refractive index of 1.45; the material B has a refractive index of 1.625; and the material C has a refractive index of 2.25. The material A can be silicon dioxide, the material B can be aluminum oxide, and the material C can be titanium dioxide.

In accordance with another embodiment of the invention, an optical fiber transmission system includes an optical fiber having a beamsplitter coupled at each end thereof. One beamsplitter is oriented with respect to the fiber at a 43° incidence having a high nonpolarizing reflectance at a wavelength $\lambda_2$ and a low loss transmission at a wavelength $\lambda_1$. The other beamsplitter is oriented with respect to the fiber at a 47° incidence having a high nonpolarizing reflectance at the wavelength $\lambda_1$ and low loss transmission at the wavelength $\lambda_2$. The value of $\lambda_1$ is 0.85 μm and the value of $\lambda_2$ is 0.81 μm.

In accordance with still another embodiment of the invention, an improved combination includes a dichroic beamsplitter having a high nonpolarizing reflectance at a wavelength $\lambda_2$ and low loss transmission at a wavelength $\lambda_1$, wherein one of the wavelengths is 0.85 μm and the other of the wavelengths is 0.81 μm. A signal at the wavelength $\lambda_1$ is suitably applied at one side of the beamsplitter, and optical fiber receiving means receive the signal at the wavelength $\lambda_2$ to the beamspitter at a third side thereof, perpendicular to the other two mentioned sides, whereby the signal at the wavelength $\lambda_2$ is reflected to the optical fiber receiving means for transmission therethrough. A power monitoring detector is coupled to a fourth side of the beamsplitter which is located directly opposite to the third side thereof.

BRIEF DESCRIPTION OF THE DRAWINGS

Other objects, advantages, and features of this invention, together with its construction and mode of operation, will become more apparent from the following description, when read in conjunction with the accompanying drawing, in which:

FIG. 3 is a diagram of optical transmittance vs. wavelength for a dichroic mirror using a multilayer stack in accordance with an embodiment of the invention, one of the curves being illustrated when the stack is operated at an incident angle of 45°, and other curves being illustrated when the stack is operated at incident angles at 43° and 47°, respectively.

DESCRIPTION OF PREFERRED EMBODIMENTS

In accordance with this invention, signals at two optical wavelengths can be successfully multiplexed, having a wavelength separation smaller than those known in the prior art, thereby permitting presently available Ga(AlAs) lasers to be used at both ends of a fiber link. The nonpolarizing characteristic of a beamsplitter in accordance with this invention provides for low insertion loss when used in an optical fiber system carrying nonpolarized light.

Insertion loss is defined as one minus the ratio of the output of a device to its input. In optical terminology, a 1% loss is expressed as a 1% insertion loss. In engineering terminology, an X% loss is expressed in decibels as $$10 \log\left(1 - \frac{X}{100}\right),$$

so that a fifty percent loss is expressed as $10 \log 0.5 = -3$. decibels (dB).

The performance of dichroic beamsplitters, in the past, have generally ignored the utilization of narrow band filters (i.e., filters which pass a narrow band of light) for increasing optical isolation. It is found that narrow band filtering greatly improves the optical isolation of a dichroic beamsplitter.

Optical isolation, an indication of the amount of unwanted signal obtained in a desired channel, is expressed in decibels as $$10 \log \frac{\text{undesired signal}}{\text{desired signal}}.$$

A grating multiplexer, as described hereinabove in connection with the prior art, has various disadvantages. A grating utilization requires a mechanical layout that is not as versatile as that of a 45° dichroic beamsplitter. The characteristics and function of a dichroic beamsplitter can be changed by replacing the beamsplitter cube with another of different design. A narrow band filter, for achieving high interchannel isolation, can be more easily added to the dichroic beamsplitter than to a diffraction grating. A grating design does not achieve the high degree of isolation between a transmitter and a receiver inherent in the use of a dichroic beamsplitter.

Figure 1:
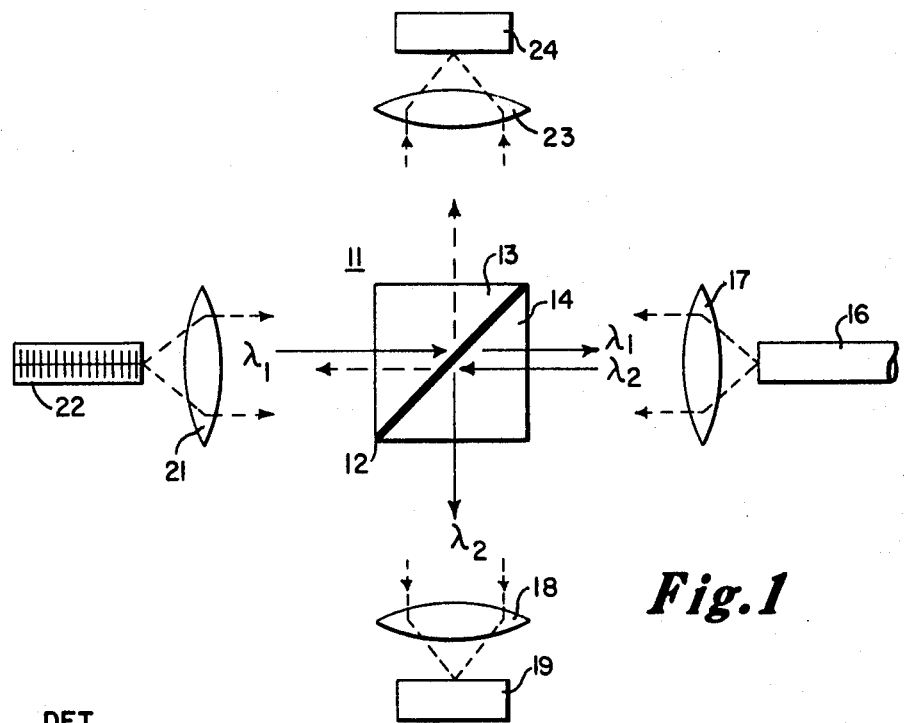
FIG. 1 is a schematic diagram of dichroic beamsplitter used in an optical duplexer and power monitor in accordance with one embodiment of the invention.

A schematic design of a dichroic beamsplitter 11, operated as an optical duplexer and power monitor, is shown in FIG. 1. A multilayer dielectric coating 12, provided to produce a high nonpolarizing reflectance at a wavelength $\lambda_2$ and low loss transmission at a wavelength $\lambda_1$, is sandwiched between two glass prisms 13, 14, each prism having an isosceles right triangular cross section. When the glass prisms 13, 14 have a refractive index of 1.52, the 53 layer dielectric stack 12, shown in Table 1, has the calculated optical characteristics as shown in FIG. 3.

TABLE 1

SEQUENCE OF REFRACTIVE INDICES IN MULTILAYER STACK ALL LAYERS TUNED FOR QUARTERWAVE OPERATION WITH 45° INCIDENCE AT .83 μm

| LAYER # | MATERIAL | LAYER # | MATERIAL |
|---|---|---|---|
| 1 | C | 28 | B |
| 2 | B | 29 | A |
| 3 | A | 30 | B |
| 4 | B | 31 | A |
| 5 | A | 32 | B |
| 6 | B | 33 | C |
| 7 | A | 34 | B |
| 8 | B | 35 | C |
| 9 | C | 36 | B |
| 10 | B | 37 | A |
| 11 | C | 38 | B |
| 12 | B | 39 | A |
| 13 | A | 40 | B |
| 14 | B | 41 | A |
| 15 | A | 42 | B |
| 16 | B | 43 | C |
| 17 | A | 44 | B |
| 18 | B | 45 | C |
| 19 | C | 46 | B |
| 20 | B | 47 | A |
| 21 | C | 48 | B |
| 22 | B | 49 | A |
| 23 | A | 50 | B |
| 24 | B | 51 | A |
| 25 | A | 52 | B |
| 26 | B | 53 | C |
| 27 | C | | |

Refractive Index of Material A = 1.45
Refractive Index of Material B = 1.625
Refractive Index of Material C = 2.25

Referring again to FIG. 1 an optical fiber 16 may carry an unpolarized optical signal at the wavelength $\lambda_2$ (in a left direction) to a lens (or other collimating means) 17 which hits the beamsplitter 11 at the coating 12. The signal at the wavelength $\lambda_2$ is generally reflected by the stack 12 and is substantially directed through a lens (or other collimating means) 18 to a receiver detector 19. A portion of the signal at the wavelength $\lambda_2$ undesirably may pass through (as indicated by the dotted arrow) to the lens (or other collimating means) 21 and strike a laser 22.

A signal from the laser 22 provides a beam through the lens (or other collimating means) 21 at the wavelength $\lambda_1$ which is directed generally through the beamsplitter 11, directly therethrough, through the lens (or other collimating means) 17, and onto the fiber link 16. A portion of the signal at the wavelength $\lambda_1$ is reflected (as indicated by the upward directed dotted arrow) into the lens (or other collimating means) 23 to a power monitoring detector 24.

Though not shown, the upper face of the prism 13 and the lower face of the prism 14 can be anti-reflected coated. The lower face, in lieu of being anti-reflected coated, can be provided with a narrow band filter which passes signals at the wavelength $\lambda_2$ only. The left face of the prism 13 (facing the lens 21) can be anti-reflected coated, or, alternatively, can carry a narrow band filter which is designed to pass signals at the wavelength $\lambda_1$ only. The right face of the prism 14 can be anti-reflected coated.

Desirably, the dimensions of the beamsplitter cube 11 are approximately 5 mm on all sides, or is consistent with the diameter of a collimated light beam which is incident on the cube 11.

Figure 2:
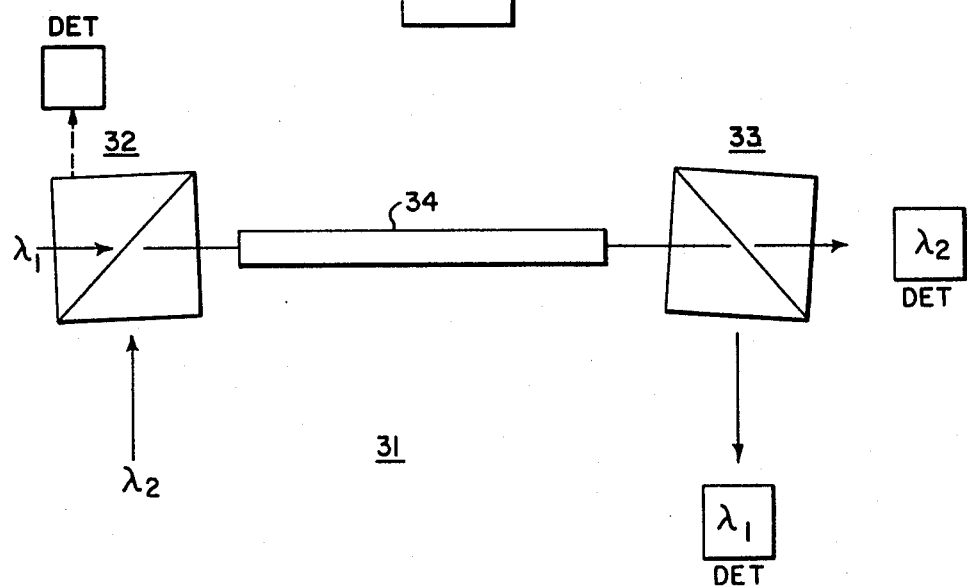
FIG. 2 is a schematic diagram of an optical fiber transmission system utilizing two complementary beamsplitters in accordance with another embodiment of the invention.

Referring to FIG. 2, an optical fiber transmission system 31 includes a pair of complementary beamsplitters 32, 33 at each end of an optical fiber 34. A pair of widely separated optical wavelengths which are easily compatible with Ga(AlAs) laser technology are 0.81 μm and 0.85 μm. Thus, preferably the beamsplitter 32, at one end of the fiber link, has the wavelength $\lambda_1$ at 0.81 μm and the wavelength $\lambda_2$ at 0.85 μm, using the convention as indicated in FIG. 1. At the right hand end of the fiber link, the beamsplitter 33 has the wavelength $\lambda_1$ at 0.85 μm and the wavelength $\lambda_2$ at 0.81 μm. Both beamsplitters 32, 33 are constructed identically, utilizing the multilayer stack as indicated in Table 1, tuned for quarterwave operation with 45° incidence at 0.83

μm. The beamsplitters 32, 33 can have complementary characteristics by adjusting the operating angle thereof by ±2° during final assembly. FIG. 3 illustrates, graphically, calculated characteristics of beamsplitters in accordance with this invention when operated at incidence angles of 45°, 43°, and 47°, as indicated by the three curves appropriately indicated. The complementary location of wavelengths $\lambda_1$ and $\lambda_2$, using the convention as indicated in FIG. 1, are noted on FIG. 3. Since angle tuning does not degrade the device performance, it is used to adjust the values of $\lambda_1$ and $\lambda_2$ in such a way that small individual differences in laser diode emission wavelength can be accommodated.

When the isolation of the wavelength $\lambda_2$ (at the left face of the cube as indicated in FIG. 1) and the wavelength $\lambda_1$ (at the bottom face of the cube as indicated in FIG. 1) is inadequate, the anti-reflected coatings on the faces can be replaced by appropriate narrow band filters. The addition of such filters can improve the isolation characteristics of the device and still permit the same beamsplitter to produce complementary responses at each end of the fiber link. This can be accomplished by interchanging the function of the right and top faces, using the top face (as indicated in FIG. 1) for interface to the fiber link and the right face (as indicated in FIG. 1) for the optical power monitor pickup. The narrow band filters on the two faces (the left face and the bottom face) are easily constructed by use of conventional multilayer technology. Since they can operate at or very close to normal incidence, polarization independent operation is assured.

A most critical requirement of a beamsplitter, in accordance with this invention, is that it have high, non-polarized reflectance at one frequency, and low reflectance or low insertion loss for at least one polarization at the other frequency or wavelength. Some sensitivity to polarization is therefore permissible at wavelength $\lambda_1$, since the laser emission is highly polarized. The polarization sensitivity, in fact, improves the system performance by reducing the amount of unpolarized spontaneous laser emission that enters the fiber. As is well known, a laser emits two types of light: It emits a polarized stimulated emission and it also emits unpolarized spontaneous emission. The possible benefit of polarization dependent transmission at the wavelength $\lambda_1$ becomes a liability when the duplexer is located far from the laser in an optical link. In such a case, the laser radiation is depolarized by the length of fiber connecting the laser to the duplexer, and higher insertion loss results when the transmission coefficient at the wavelength $\lambda_1$ is polarization dependent.

For a multilayer dielectric component to be practical, it should be constructed from readily available and compatible optical coating materials. The stack design given in Table 1 was chosen because it satisfies this requirement. The three materials used in the stack can, for example, be silicon dioxide, n=1.45; aluminum oxide, n=1.625; and titanium dioxide, n=2.25. Another important consideration is the sensitivity of the design to errors in layer thickness and/or refractive index.

Studies on the consequences of ±5% refractive index errors indicate that the layers of nominal index 1.45 and 2.25 are most tolerant of increases in index, while the layers of nominal index 1.625 are most tolerant of decreases in index. These results were obtained by computer simulation, changing the index of all layers of a given material by ±5%, while holding the other indices constant at their design values.

The advantages of a dichroic beamsplitter in accordance with this invention over previous optical wavelength multiplexer designs include:

a. High internal isolation between the diode laser and the detector. This level of receiver isolation cannot be obtained using gratings as in the prior art.

b. Low loss due to nonpolarizing dichroic reflector design. The stack sequence shown in Table 1 overcomes performance deficiencies previously reported for dichroic beamsplitters used as optical wavelength multiplexers and demultiplexers.

c. Easy performance improvement by the use of the additional narrow band filters. Narrow band filtering is more difficult to use in conjunction with existing duplexers based on gratings.

d. Smallest reported separation between optical channels. Previously reported dichroic beamsplitter designs were only considered practical for separating widely spaced wavelengths, i.e., 0.85 μm and 1.06 μm. The small separation between optical channels at 0.81 μm and 0.85 μm permits Ga(AlAs) laser diode sources to be used on both ends of an optical link.

e. Angle tuning of the beamsplitter cube provides for optimization of device performance. The multilayer stack shown in Table 1 can be angle tuned to provide complementary device characteristics at each end of the optical link. Angle tuning also compensates for small errors in laser diode emission wavelength.

f. Provision for simultaneous use as an optical power monitor. This function cannot be accomplished by existing grating duplexer designs.

g. Simple mechanical layout provides for multifunction modular construction. The external collimating means, illustrated in FIG. 1, can be mounted in a simple fixture and the device characteristics can be quickly changed by replacing the beamsplitter cube with one of a different design. This versatility cannot be matched by existing duplexer designs based on diffraction gratings.

Other modifications of this invention can be performed without departing from the spirit and scope of this invention. For example, the collimating means indicated in FIG. 1 can consist of lens, mirrors, SELFOC rods, and other components that can convert the diverging fiber radiation pattern into a collimated beam. The operating region of the beamsplitter can also be tuned to be within the 1.2–1.6 μm optical emission range of InGaAsP diode lasers.

What is claimed is:

1. A dichroic beamsplitter comprising two glass prisms, each having an isosceles right triangular cross-section, and a multilayer dielectric coating sandwiched therebetween, each layer of said coating being tuned for quarterwave operation with 45° incidence of light at 0.83 μm, said coating comprising a plurality of layers of materials as follows:

| Layer No. | Material | Layer No. | Material | Layer No. | Material |
| --- | --- | --- | --- | --- | --- |
| 1 | C | 19 | C | 37 | A |
| 2 | B | 20 | B | 38 | B |
| 3 | A | 21 | C | 39 | A |
| 4 | B | 22 | B | 40 | B |
| 5 | A | 23 | A | 41 | A |
| 6 | B | 24 | B | 42 | B |
| 7 | A | 25 | A | 43 | C |
| 8 | B | 26 | B | 44 | B |
| 9 | C | 27 | C | 45 | C |
| 10 | B | 28 | B | 46 | B |
| 11 | C | 29 | C | 47 | A |

-continued

| Layer No. | Material | Layer No. | Material | Layer No. | Material |
|---|---|---|---|---|---|
| 12 | B | 30 | B | 48 | B |
| 13 | A | 31 | A | 49 | A |
| 14 | B | 32 | B | 50 | B |
| 15 | A | 33 | C | 51 | A |
| 16 | B | 34 | B | 52 | B |
| 17 | A | 35 | C | 53 | C |
| 18 | B | 36 | B | | | wherein A, B, and C represent different materials.

2. The beamsplitter as recited in claim 1 wherein said material A has a refractive index of 1.45; said material B has a refractive index of 1.625; and said material C has a refractive index of 2.25.

3. The beamsplitter as recited in claim 1 wherein said material A is $SiO_2$; said material B is $Al_2O_3$; and said material C is $TiO_2$.

4. An optical fiber transmission system comprising an optical fiber;
a first beamsplitter as recited in claim 3 at one end of said fiber; and
a second beamsplitter as recited in claim 3 at the other end of said fiber;
said first beamsplitter being oriented with respect to said fiber at 43° incidence, having a high nonpolarizing reflectance at wavelength $\lambda_2$ and low loss transmission at wavelength $\lambda_1$; and
said second beamsplitter being oriented with respect to said fiber at 47° incidence, having a high, nonpolarizing reflectance at said wavelength $\lambda_1$ and low loss transmission at said wavelength $\lambda_2$, wherein
$\lambda_1 = 0.81$ μm and
$\lambda_2 = 0.85$ μm.

5. In combination,
a dichroic beamsplitter having a high nonpolarizing reflectance at wavelength $\lambda_2$ and low loss transmission at wavelength $\lambda_1$, wherein one of said wavelength is 0.85 μm and the other of said wavelength is 0.81 μm;
means for applying a signal at wavelength $\lambda_1$ at one side of said beamsplitter;
optical fiber receiving means for receiving said wavelength $\lambda_1$ at a side of said beamsplitter opposite to said one side;
means for providing a signal at wavelength $\lambda_2$ to said beamsplitter at a third side thereof, which is perpendicular to both said one side and said opposite side, so that said signal at said wavelength $\lambda_2$ is reflected to said optic fiber receiving means for transmission therethrough; and
a detector for power monitoring coupled to a fourth side of said beamsplitter, said fourth side being directly opposite to said third side of said beamsplitter.

* * * * *